United States Patent [19]

Kozora

[11] Patent Number: 5,334,233
[45] Date of Patent: Aug. 2, 1994

[54] CYLINDER-PORT BLOCK ARRANGEMENT FOR GLASS CONTAINER FORMING APPARATUS

[76] Inventor: Joseph W. Kozora, R.D. #2, Box 559A, Valencia, Pa. 16059

[21] Appl. No.: 54,260
[22] Filed: Apr. 30, 1993
[51] Int. Cl.$^5$ ............................................. C03B 11/10
[52] U.S. Cl. ...................................... 65/171; 65/362; 65/321; 65/356
[58] Field of Search .................. 65/362, 215, 173, 171, 65/314, 356, 321

[56] References Cited

U.S. PATENT DOCUMENTS

| | | | |
|---|---|---|---|
| 3,178,276 | 11/1960 | Kawecka | 65/356 |
| 5,028,249 | 7/1991 | Trahan | 65/319 |
| 5,057,139 | 10/1991 | Stankosky | 65/356 |
| 5,139,559 | 8/1992 | Kozora | 65/319 |

Primary Examiner—W. Gary Jones
Assistant Examiner—John Hoffmann
Attorney, Agent, or Firm—George C. Atwell

[57] ABSTRACT

A forming plunger mechanism for glass container manufacturing of the type used in an I.S. machine and having at least one vertically-oriented cylinder containing a reciprocally-driven piston for repeatedly driving a plunger upwardly into parisons contained by a blank mould, wherein a saddle plate is provided for supporting one or more vertically-oriented cylinders. The saddle plate is adapted to accommodate on its upper surface a plurality of repositionable port blocks. Each port block has internal conduit channels with generally laterally-facing ports which operatively register with ports at the lower end of the cylinder. The conduit channels have substantially upwardly-facing openings for connection thereto with ends of hoses which serve to conduct a pressurized air stream through the port block and into the cylinder for driving the cylinder's piston in a reciprocal action and for conducting a cooling air flow through the mechanism. The port blocks may be selectively repositioned on the upper surface of the saddle plate to accommodate more than one cylinder size without disturbing the connection of the hose ends to the port blocks. Provision is made for electrical sensing within the cylinders and for completing electrical circuit connection at the cylinder's distal end as a function of installing the cylinder in its operative position. The saddle plate is provided with upper surface grooves for containing insulated conductor leads which extend from the point of connection on the underface of the distal end of the cylinder and outwardly from the lateral surface of the saddle plate.

13 Claims, 5 Drawing Sheets

CYLINDER-PORT BLOCK ARRANGEMENT FOR GLASS CONTAINER FORMING APPARATUS

BACKGROUND OF THE INVENTION

This invention relates generally to a plunger mechanism in a glass container forming machine and more particularly pertains to a saddle plate structure for supporting the plunger mechanism and port blocks repositionably mounted on the upper surface of the saddle plate for providing a pressurized fluid flow to the cylinder.

It is common industrial practice to utilize a vertically-oriented cylinder having a reciprocally-driven piston for pressing a plunger upwardly into a molten glass gob as one step in the process of forming a glass container. It is also common practice to support one or more such cylinders on a saddle plate in a glass container forming machine.

It has become common practice to change the size and/or the number of cylinders utilized in such a machine to thereby produce different styles of glass containers and the number of containers being produced by the machine. Commonly, to accomplish a cylinder change, it is necessary to change the saddle plate on which cylinders are supported, utilizing a different saddle plate, the design of which is consistent with the provision of one or a plurality of cylinders. Such machine changeover requires considerable down-time because hoses for directing pressurized fluid flow through conduits formed in the saddle plate must be first disconnected then properly reconnected to the replacement saddle plate. Saddle plates provided with such internal conduits and means for hose or pipe connections to laterally-facing ports D on the saddle plate are disclosed in U.S. Pat. Nos. 3,190,188; 4,272,273; and 3,314,775.

SUMMARY OF THE INVENTION

The present invention comprehends the provision of a unique saddle plate and port block structure which enables selective interchangeability of cylinders on the same saddle plate without any need for cumbersome conduit disconnection. The present invention also provides for automatic electrical connection of a sensing means contained within the cylinder, with a connection to an electrical fitting in the saddle plate being completed as a function of the installation of the cylinder into its operative position.

DETAILED DESCRIPTION OF THE PREFERRED EMBODIMENTS

Figure 1:
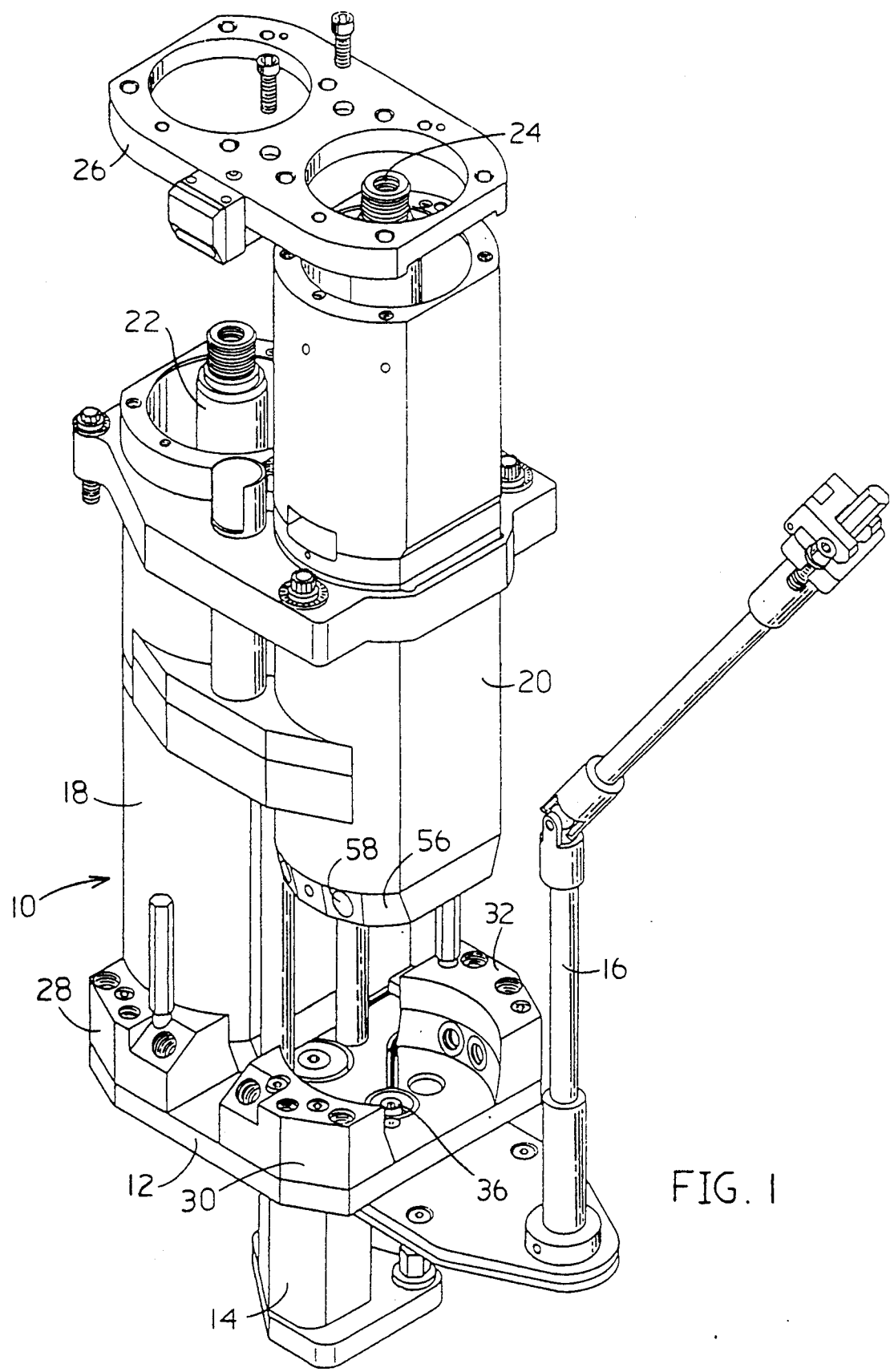
FIG. 1 is an isometric, partially exploded view of a plunger mechanism in accordance with the present invention.

FIG. 1 illustrates a plunger mechanism 10 for an I.S. (Individual Section) glass container forming machine, including a saddle plate 12 supported on an adjustable foot 14 which may be manually adjusted by control 16. The saddle plate 12 is adapted to support cylinders 18 and 20 thereon. The cylinder 18 contains a vertically-reciprocal piston 22, and the cylinder 20 contains a vertically-reciprocal piston 24. A connecting plate 26 is utilized to retain the cylinders 18 and 20 in their operative position on the support plate 12 for operation of the plunger mechanism 10. Removably attached to an upper surface 27 of the saddle plate 12 are port blocks 28, 30, and 32. Each cylinder 18 and 20 utilizes oppositely-disposed port blocks, so the one which would be opposite port block 28, in FIG. 1, is not shown due to the presence of the cylinder 18 in its operative position. The saddle plate 12 is provided with an opening 36 to accommodate a fixed electrical connection device as hereinafter further explained.

Figure 2:
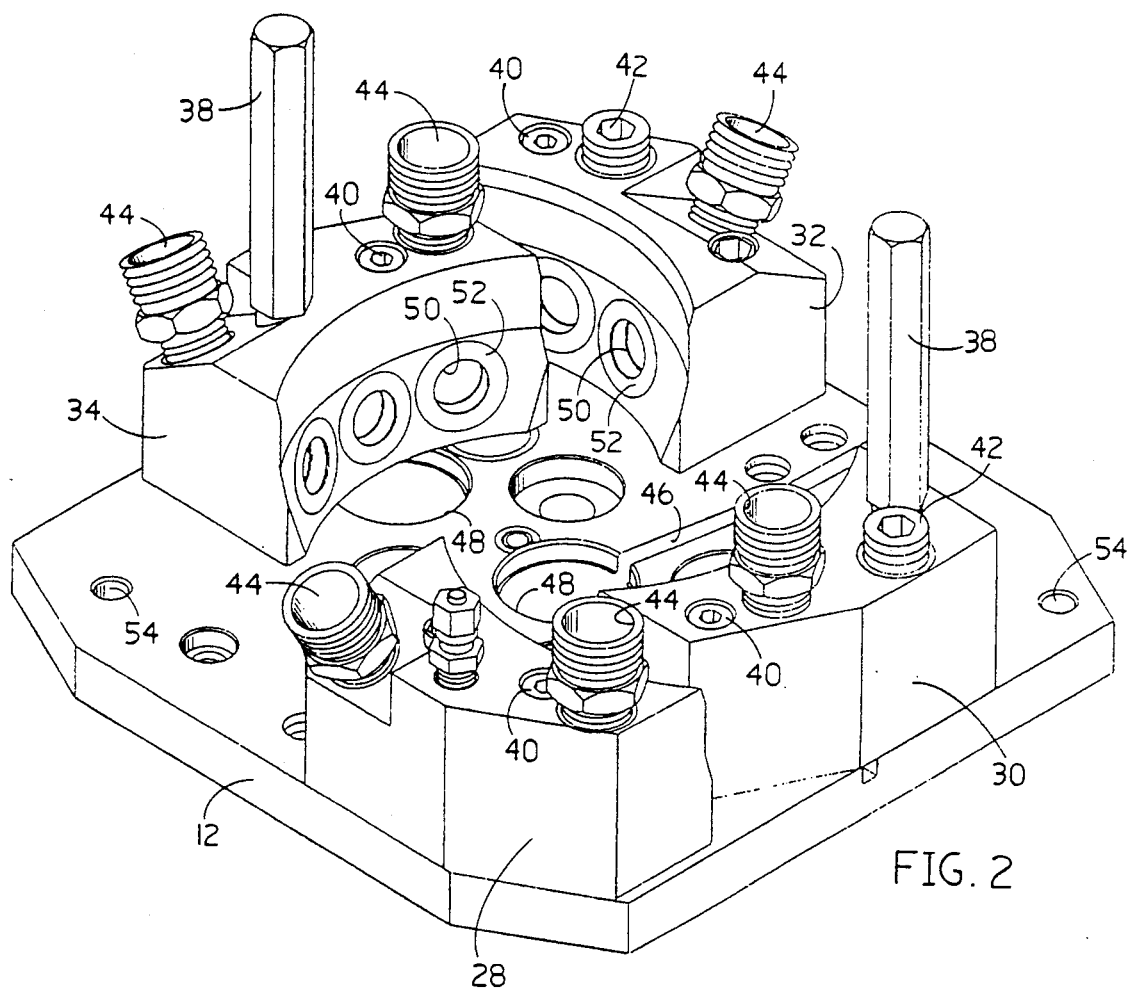
FIG. 2 is an isometric view of a saddle plate and port block assembly as first shown in FIG. 1 but, here, shown in substantially larger scale.

FIG. 2 illustrates a saddle plate of the type 12 shown in FIG. 1 on which are mounted removably-attached, repositionable port blocks 28, 30#32, and 34. Comparing FIG. 2 to FIG. 1, it will be seen that the port block assembly has been rearranged on the upper surface 27 of the saddle plate 12 in FIG. 2 to accommodate a single cylinder rather than the pair of cylinders shown in FIG. 1. Hold-down studs 38 are utilized to hold the port blocks 30 and 34 in their operative position on the saddle plate 12 in FIG. 2 whereas port blocks 28 and 32 are in a non-use "parked" position consistent with FIG. 1. FIG. 2 also illustrates the use of temporary plugs 42 in port blocks 30 and 32 to block off conduit channels through the respective port blocks which are not utilized in the particular operational arrangement shown in FIG. 2. Further, each of the port blocks 28, 30, 32, and 34 are shown to have hose connectors 44 for providing pressurized fluid flow (typically, a pressurized air stream) through the port blocks 28, 30, 32 and 34 and thence to the cylinders 18 and 20 for the purpose of driving the reciprocal pistons 22 and 24 within the cylinders 18 and 20 and providing a cooling air flow thereto.

Figure 3:
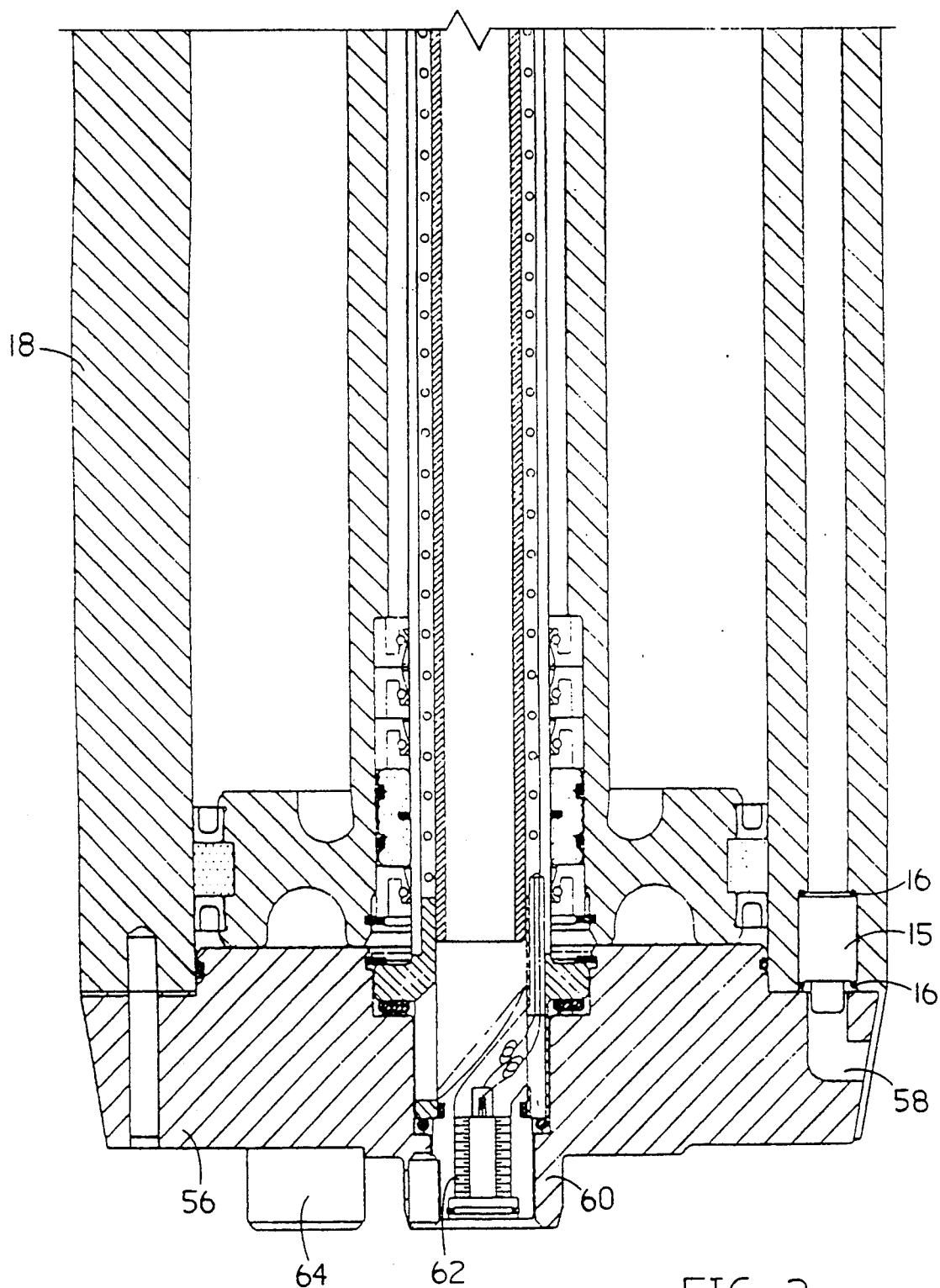
FIG. 3 is a view in vertical section showing the lower end of a cylinder component in accordance with the present invention.

Reference is now made to FIG. 3 which shows, in vertical section, the cylinder 18 having a distal end or end cap 56 and an annular end cap projection 60 containing an electrical connector 62. When the cylinder 18 is placed in its operative position on the saddle plate 12, a locator pin 64 registers with a complimentary opening in the saddle plate 12 to properly position the cylinder in its operative mode. Because each port block 28, 30, 32, and 34 presents a laterally-disposed face which is arcuate along a horizontal line and angled back from the vertical, as shown in FIG. 1, and because the end cap 56 is appropriately shaped consistent with the port blocks 28, 30, 32, and 34, the positioning of the cylinder 18 in its operative position serves to complete an electrical connection at connector 62 and to align conduit channels provided through the end cap 56 with the ports of the port blocks 28, 30, 32, and 34, all as a function of downward installation of the cylinder 18.

Figure 5:
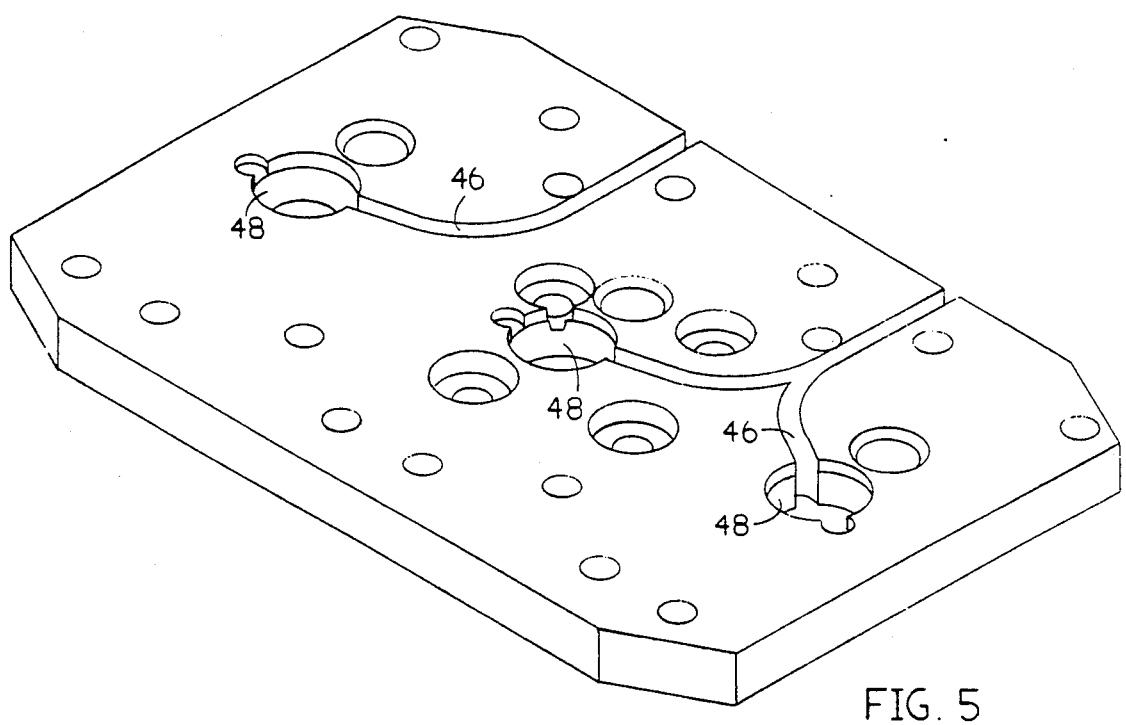
FIG. 5 is an isometric view of the saddle plate shown in FIG. 2 but without the port block assemblies attached thereto.

FIGS. 2 and 5 an embodiment of the saddle plate 12 that is provided with openings 48 to contain one side of an electrical connector and surface grooves 46 in the upwardly-facing surface of the saddle plate 12 to enable insulated electrical conductor leads to extend from the electrical connector (not shown) to be contained in each opening 48 and outwardly through the lateral side surface of the saddle plate 12.

Each port block, such as block 34 in FIG. 2, is provided with a plurality of conduit channels 50 therethrough with ports positioned to come into firm registration with port openings on the cylinder end cap 56 when the cylinder 18 is installed on the saddle plate 12. Each port on the port block 34 has an annular compressible seal 52 to assure a non-leaking sliding registration with the corresponding port opening on the cylinder 18.

With reference to FIG. 3, it will be seen that conduit 58 projects outwardly as a port opening on the angled side of the end cap 56 of the cylinder 18, and serves as a means of conducting lubricant to the plunger mechanism. Other conduit channels which would be provided through the end cap 56 for flow communication with the ports 50 of the port block 34 are not shown in FIG. 3 in view of the vertical section type of illustration. FIG. 3 illustrates various components of a plunger position sensing mechanism which includes the electrical connector 62. Details of this sensing device may be found in U.S. Pat. No. 5,139,559.

Figure 4:
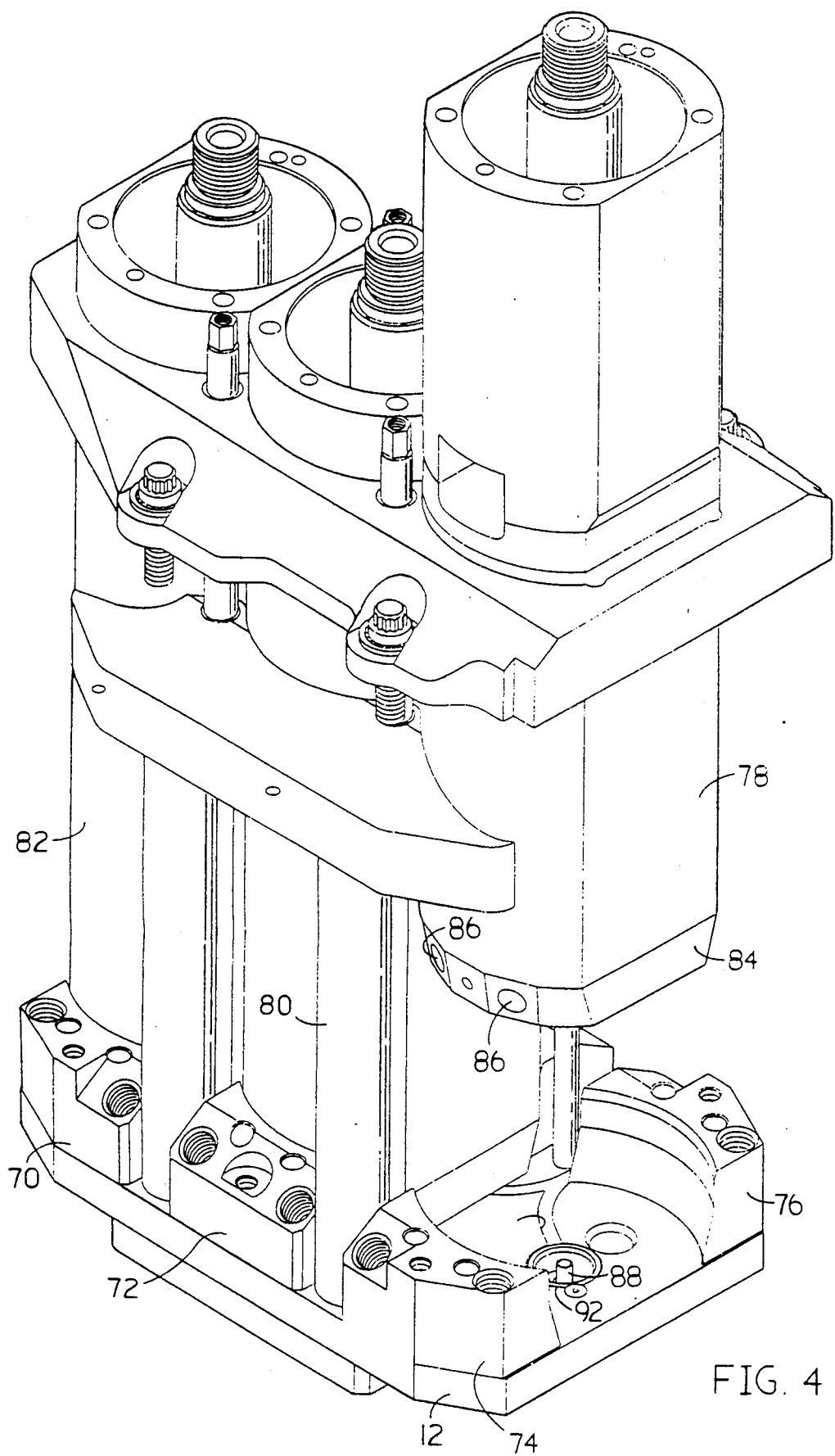
FIG. 4 is an isometric view of a second embodiment of the present invention.

FIG. 4 illustrates a second embodiment for the saddle plate 12 on which are positioned repositionable port blocks 70, 72, 74, and 76. The plunger mechanism shown in FIG. 4 is referred to as a triple-gob plunger mechanism because of its employment of three cylinders 78, 80, and 82. The port blocks which would service the back side of cylinders 80 and 82 are not shown in FIG. 4. FIG. 4 does illustrate the typical construction for a cylinder end cap on the cylinder 78. The end cap 84 is appropriately shaped with angled lateral surfaces to conformably register with the port blocks 74 and 76 positioned therebelow, when the cylinder 78 is moved downwardly vertically into its operative position whereby conduit openings such as 86 will slide into sealed registration with the ports of the port blocks 74. It should be noted in FIG. 4 that the saddle plate 12 would be provided with an opening 88 centrally disposed beneath each cylinder to insertably receive therein the annular projection 60 (see FIG. 3) and form a connection, as a function of the cylinder installation, between the connector 62 (FIG. 3) with connector 92 (FIG. 4).

The plunger mechanism assembly hereinabove disclosed provides a unique saddle plate and port block arrangement which can accommodate one or a plurality of cylinders thereon. Consistent with the present invention, the saddle plate may be designed to alternatively support either a single cylinder or tandem cylinders thereon, or, as shown in Fig. 5, the saddle plate may be configured to accommodate either a single-, double-, triple-, or quadgob arrangement. Through proper utilization of the teachings of this invention, the overall cost of the plunger mechanism may be significantly reduced and the down-time required to accomplish cylinder change, cylinder size, or the number of cylinders to be used may be significantly reduced.

Other and further objects and advantages of this invention will become apparent to those skilled in the art after a full familiarization with the accompanying drawings and the preceding description.

While the foregoing description has shown and described the fundamental novel features as applied to the preferred embodiments of this invention, it will be understood by those skilled in the art that modifications embodied in various forms may be made without departing from the spirit and scope of the invention as set forth in the claims appended hereto.

I claim:

1. A forming plunger mechanism assembly used in the manufacture of glass containers as part of a glass container forming machine, the forming plunger mechanism assembly comprising:

a generally horizontally disposed saddle plate for supporting one or more cylinders thereon;
   the saddle plate having an upper surface and a peripheral lateral side surface;
   a plurality of removably attachable port blocks disposed on the upper surface of the saddle plate;
   means acting between each port block and the saddle plate enabling selective repositioning of the port blocks;
   at least one narrow surface groove extending from the lateral surface and across the upper surface of the saddle plate to a pre-established point of the saddle plate so that one or more electrical conducting leads can be disposed within the groove and run from the pre-established point to the lateral surface; and
   a cylinder installed upon and supported by the said plate.

2. The assembly of claim 1 wherein each port block includes a bottom surface which is disposed contiguous to the upper surface of the saddle plate, a lateral surface having a plurality of side ports, means projecting downwardly through each port block for removably attaching each port block in a desired position on the upper surface of the saddle plate, and a generally upwardly-facing surface having a plurality of upwardly-oriented ports, a conduit channel through each port block from one of the side ports to one of the upwardly-oriented ports.

3. The assembly of claim 2 wherein the cylinder includes an end cap with spaced-apart port openings directed substantially laterally therefrom so that the side ports of each port block can be disposed to sealably register with the port openings when the cylinder is installed by a downward-positioning action on the saddle plate.

4. The assembly of claim 3 wherein each conduit channel has an outer end which includes an annular seal which registers with each port opening of the cylinder end cap when the cylinder is installed on the saddle plate to achieve a non-leaking registration of the outer end of each conduit channel with its respective port opening.

5. The assembly of claim 3 wherein the port blocks are removably attachable to the saddle plate in opposed space relation to each other so that the cylinder can be installed on the saddle plate between the port blocks so that the port openings of the cylinder end caps are disposed in non-leaking registration with the annular seals on the outer ends of the conduit channels.

6. A forming plunger mechanism for glass container manufacturing, of the type used in an I.S. machine, having a vertically-oriented cylinder containing a reciprocally-driven piston for repeatedly driving a plunger upwardly into molten glass gobs, and a saddle plate which supports the cylinder in a vertically oriented operative position, the plunger mechanism comprising:

the saddle plate being stationary and having an upwardly-facing substantially flat surface and the cylinder having a lower end with port openings for receiving a pressurized fluid flow for driving the piston;

means for diverting the pressurized fluid in the cylinder to drive the piston comprising a port block removably spaced to the upwardly-facing flat surface of the saddle plate; and means on either the cylinder or the port clock for sealing the lower end of the cylinder in fluid flow communication to the port block when the cylinder is placed in its vertically-oriented operative position on the saddle plate.

7. The mechanism of claim 6 wherein the port block is capable of being positioned and repositioned on different portions of the flat surface of the saddle plate to accommodate the interchange of a plurality of differently sized cylinders for use in the plunger mechanism.

8. The mechanism of claim 6 further comprising fastener means operative between the port block and the saddle plate for securing one to the other.

9. The mechanism of claim 8 wherein the fastener means is accessible from directly above the port block to effect repositioning of the port block on the saddle plate.

10. The mechanism of claim 6 wherein the saddle plate includes a series of bores opening in predetermined locations on the upwardly-facing surface with at least one of the bores serving as a means of engageably positioning the port block at a predetermined position on the saddle plate surface.

11. The mechanism of claim 10 wherein the port block has a downwardly-projecting indexing pin insertably received in one of the bores on the saddle plate surface when the port block is operatively positioned on the saddle plate.

12. A forming plunger mechanism assembly used in the manufacture of glass containers as part of a glass container forming machine, the forming plunger mechanism assembly comprising:

a generally horizontally disposed saddle plate for supporting one or more cylinders thereon;

the saddle plate having an upper surface and a peripheral lateral side surface;

a plurality of removably attachable port blocks disposed on the upper surface of the saddle plate; and means acting between each port block and the saddle plate enabling selective repositioning of the port blocks on the saddle plate.

13. The assembly of claim 12 wherein at least one narrow surface groove extends from the lateral surface and across the upper surface of the saddle plate to be pre-established point on the saddle plate so that one or more electrical conducting leads can be disposed within the groove and run from the pre-established point to the lateral surface.

* * * * *